(12) United States Patent
Kishida

(10) Patent No.: US 10,200,588 B2
(45) Date of Patent: Feb. 5, 2019

(54) METHOD INCLUDING GENERATING AND DISPLAYING A FOCUS ASSIST IMAGE INDICATING A DEGREE OF FOCUS FOR A PLURALITY OF BLOCKS OBTAINED BY DIVIDING A FRAME OF IMAGE SIGNAL

(71) Applicant: Panasonic Intellectual Property Management Co., Ltd., Osaka (JP)

(72) Inventor: Yuki Kishida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 14/659,652

(22) Filed: Mar. 17, 2015

(65) Prior Publication Data

US 2015/0281555 A1    Oct. 1, 2015

(30) Foreign Application Priority Data

Mar. 26, 2014  (JP) .................................. 2014-063505

(51) Int. Cl.
*H04N 5/232*    (2006.01)
*G03B 13/18*    (2006.01)
(Continued)

(52) U.S. Cl.
CPC ......... *H04N 5/23212* (2013.01); *G03B 13/18* (2013.01); *H04N 5/23222* (2013.01);
(Continued)

(58) Field of Classification Search
None
See application file for complete search history.

(56) References Cited

U.S. PATENT DOCUMENTS

2004/0218086 A1* 11/2004 Voss ................... H04N 5/23212
                                                348/345
2006/0061678 A1*  3/2006 Yamazaki .......... H04N 5/23212
                                                348/349
(Continued)

FOREIGN PATENT DOCUMENTS

JP    2001-013401    1/2001
JP    2002-267925    9/2002
(Continued)

*Primary Examiner* — Twyler L Haskins
*Assistant Examiner* — Wesley J Chiu
(74) *Attorney, Agent, or Firm* — Wenderoth, Lind & Ponack, L.L.P.

(57) ABSTRACT

The imaging apparatus of the present technique is provided with an imaging unit configured to generate an image signal from a subject; and an evaluation value calculator configured to calculate an evaluation value that indicates a degree of focusing on the subject from the image signal obtained by the imaging unit for each block, and to output the evaluation value. The imaging apparatus is further provided with a combining unit configured to generate a focus assist video image based on the focus evaluation value, output from the evaluation value calculator, of each block, to combine the generated assist video image with the image signal, and to output the assist video image combined with the image signal; and a display unit configured to display an image in which the assist video image combined by the combining unit is combined.

12 Claims, 11 Drawing Sheets

(51) Int. Cl.
   *G02B 7/36*      (2006.01)
   *G02B 7/09*      (2006.01)
   *H04N 5/272*     (2006.01)

(52) U.S. Cl.
   CPC ........... *H04N 5/23293* (2013.01); *G02B 7/09*
                  (2013.01); *G02B 7/36* (2013.01); *H04N 5/272*
                                                        (2013.01)

(56)            References Cited

U.S. PATENT DOCUMENTS

| | | | | |
|---|---|---|---|---|
| 2006/0078217 | A1* | 4/2006 | Poon | H04N 5/23212 |
| | | | | 382/255 |
| 2009/0102960 | A1* | 4/2009 | Tsuchiya | H04N 5/23209 |
| | | | | 348/345 |
| 2009/0109310 | A1* | 4/2009 | Kobayashi | H04N 5/142 |
| | | | | 348/302 |
| 2012/0057062 | A1* | 3/2012 | Hamada | G02B 7/102 |
| | | | | 348/333.02 |
| 2012/0188408 | A1* | 7/2012 | Nakaoka | G02B 7/28 |
| | | | | 348/231.99 |
| 2014/0176783 | A1* | 6/2014 | Shibagami | H04N 5/23212 |
| | | | | 348/349 |
| 2014/0184889 | A1* | 7/2014 | Wada | H04N 5/23212 |
| | | | | 348/353 |
| 2014/0211030 | A1* | 7/2014 | Hideshima | G03B 5/00 |
| | | | | 348/208.11 |
| 2014/0267869 | A1* | 9/2014 | Sawa | H04N 5/23293 |
| | | | | 348/333.03 |
| 2015/0042866 | A1* | 2/2015 | Wakazono | H04N 5/23212 |
| | | | | 348/346 |

FOREIGN PATENT DOCUMENTS

| | | |
|---|---|---|
| JP | 2002-277725 | 9/2002 |
| JP | 2002-365522 | 12/2002 |
| JP | 2007-248616 | 9/2007 |
| JP | 2012-145840 | 8/2012 |

\* cited by examiner

FIG. 4

| 10 | (40) | 20 | 1 |
|----|------|----|----|
| 56 | 84 | 15 | (89) |
| (48) | 14 | 18 | 41 |
| 18 | 12 | 42 | (84) |

METHOD INCLUDING GENERATING AND DISPLAYING A FOCUS ASSIST IMAGE INDICATING A DEGREE OF FOCUS FOR A PLURALITY OF BLOCKS OBTAINED BY DIVIDING A FRAME OF IMAGE SIGNAL

BACKGROUND

1. Field

The present technique relates to an imaging apparatus that is able to display a focusing degree.

2. Description of the Related Art

Imaging apparatuses such as a digital camera serve a manual focus (hereinafter referred to as MF) function which supports a user in manually adjusting a focus. The imaging apparatuses with the MF function use functions of calculating an evaluation value that indicates a focusing degree by carrying out predetermined operations on output of an imaging element and of displaying the focus evaluation value on a finder. For example, Unexamined Japanese Patent Publication No. 2007-248616 discloses a technique of allowing a user to specify a region of a video image and displaying a focus evaluation value at an edge of an image on a finder to help the user to focus the imaging apparatus on the video image in the specified region.

SUMMARY

The imaging apparatus of the present technique is provided with an imaging unit configured to generate an image signal from a subject; and an evaluation value calculator configured to calculate an evaluation value that indicates a degree of focusing on the subject from the image signal obtained by the imaging unit for each block, and to output the evaluation value. The imaging apparatus is further provided with a combining unit configured to generate a focus assist video image based on the focus evaluation value, output from the evaluation value calculator, of each block, to combine the generated assist video image with the image signal, and to output the assist video image combined with the image signal; and a display unit configured to display an image in which the assist video image combined by the combining unit is combined.

BRIEF DESCRIPTION OF DRAWINGS

FIG. 4 is a diagram illustrating an exemplary method of calculating the first focus evaluation value for a block which is four pixels by four pixels;

DETAILED DESCRIPTION

An imaging apparatus according to an exemplary embodiment of the present technique will be described below with reference to the drawings. However, an excessively detailed description may be omitted. For example, a detailed description of an already well-known matter and a repetitive description of substantially the same configuration may be omitted. Such omissions are intended to prevent the following description from becoming unnecessarily redundant to facilitate understanding by those skilled in the art. It should be noted that the inventors provide the accompanying drawings and the following description for those skilled in the art to fully understand the present technique and do not intend to limit the subject described in the claims by the accompanying drawings and the following description.

Exemplary Embodiment 1-1. Configuration

Figure 1:
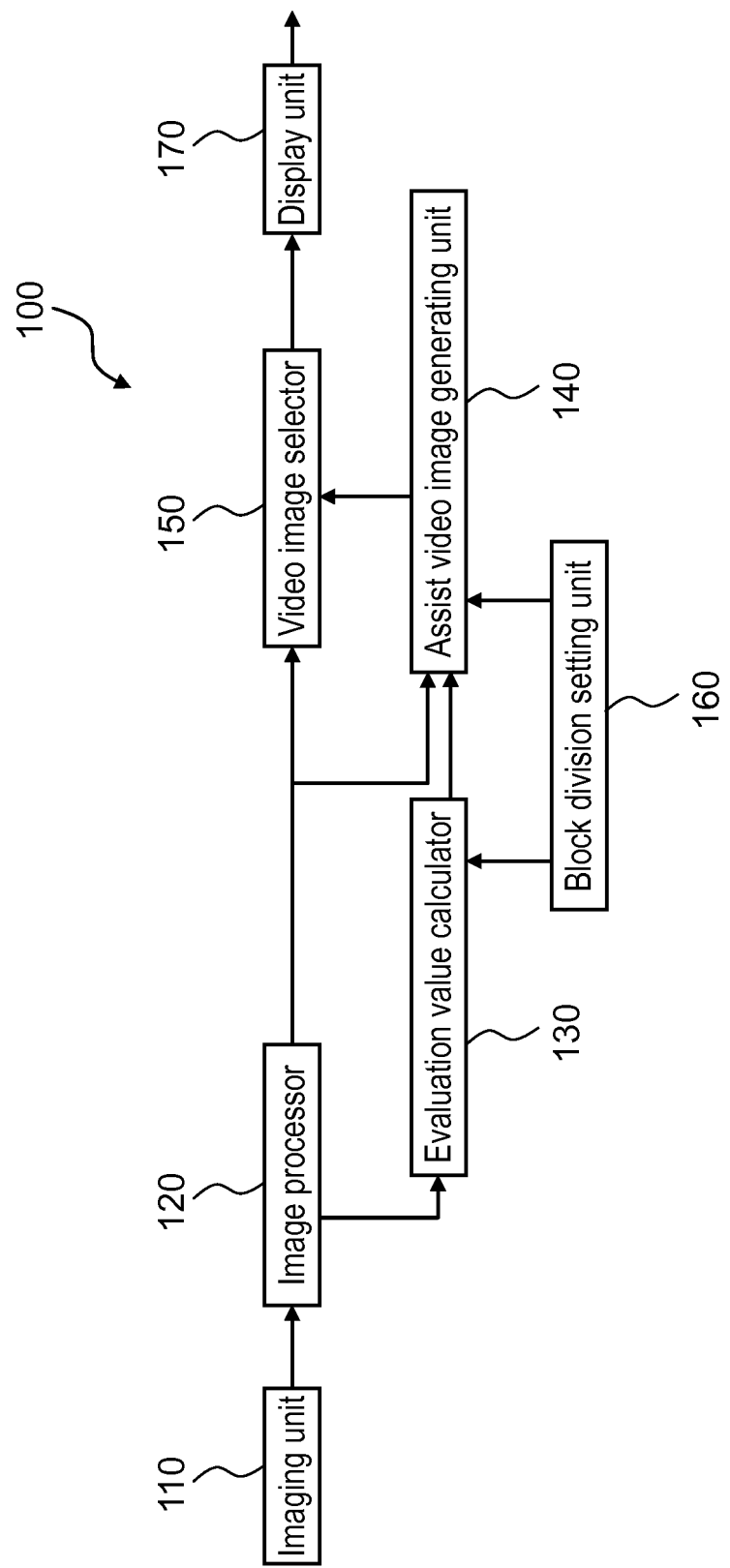
FIG. 1 is a block diagram illustrating a configuration of an imaging apparatus according to an exemplary embodiment of the present technique.

FIG. 1 is a block diagram illustrating a configuration of an imaging apparatus according to an exemplary embodiment of the present technique. As illustrated in FIG. 1, imaging apparatus 100 is provided with imaging unit 110 as a video image input unit that includes an imaging element which is configured to generate an image signal from a subject and with image processor 120 configured to perform various types of image processing such as gamma correction. Evaluation value calculator 130 which receives an output signal from image processor 120 is configured to calculate an evaluation value that indicates a focusing degree (hereinafter, referred to as a focus evaluation value) for each block by carrying out predetermined operations on the image signal obtained from the imaging element of imaging unit 110. That is, evaluation value calculator 130 calculates the focus evaluation value which indicates a degree of focusing on the subject from the image signal obtained by imaging unit 110 for each block and outputs the focus evaluation value. Assist video image generating unit 140 is a combining unit which receives the output signal from evaluation value calculator 130. Assist video image generating unit 140 is configured to generate a focus assist video image with which the image signal output from image processor 120 is overlaid and to output the image signal overlaid with the generated focus assist video image. Video image selector 150 is configured to receive the output signal from image processor 120 and the output signal from assist video image generating unit 140 and to select one or both of these signals and to output the selected signals. Block division setting unit 160 is configured to input signals for setting items such as a number of block divisions and a start position of a block to evaluation value calculator 130 and assist video image generating unit 140. Display unit 170 is configured to receive the image signal output from video image selector 150 and to present a predetermined display. Although FIG. 1 does not illustrate an optical system including a focus lens group, imaging apparatus 100 has a manual focus function.

Imaging unit 110 has a CMOS image sensor as an imaging element, a sensor driving circuit, and an analog-to-digital converter, and is configured to convert light from the subject into an electric signal by photoelectric conversion and input the electric signal to image processor 120 as a digital image signal. Image processor 120 is configured to perform various types of image processing such as spot correction, white balance correction, and gamma correction.

Block division setting unit 160 is configured with a microcomputer or the like, and is configured to set a number of blocks in a frame video image and to set a start position of a block when the assist display is to be presented.

Evaluation value calculator 130 is configured to calculate the focus evaluation value in response to the block which has been set by block division setting unit 160 and to output the focus evaluation value of each block to assist video image generating unit 140.

Assist video image generating unit 140 as the combining unit is configured to generate the focus assist video image based on the focus evaluation value of each block output from evaluation value calculator 130, to combine the generated assist video image with the image signal of each frame output from image processor 120 by overlaying the assist video image on the image signal, and to output the assist video image combined with the image signal.

Video image selector 150 is configured to select one or more of the frame video image output from image processor 120 and the frame video image overlaid with the assist video image output from assist video image generating unit 140 and to output the selected frame video images. Display unit 170 is configured with a viewfinder or the like, and is configured to display a predetermined video image based on the image signal output from video image selector 150. Specifically, the frame video image output from image processor 120 or the frame video image combined with the assist video image output from assist video image generating unit 140 is selected by video image selector 150 and input to display unit 170, so that the selected frame video image is displayed by display unit 170.

The present exemplary embodiment will be described by taking an example of a case where a whole screen is divided.

The image signal output from imaging unit 110 is input to image processor 120 and is subjected to various types of image signal processing such as spot correction, white balance correction, and gamma correction. The image signal is output from image processor 120 to evaluation value calculator 130, assist video image generating unit 140, and video image selector 150, respectively. Evaluation value calculator 130 is configured to calculate the focus evaluation value of each optional block which has been set by block division setting unit 160.

Figure 2:
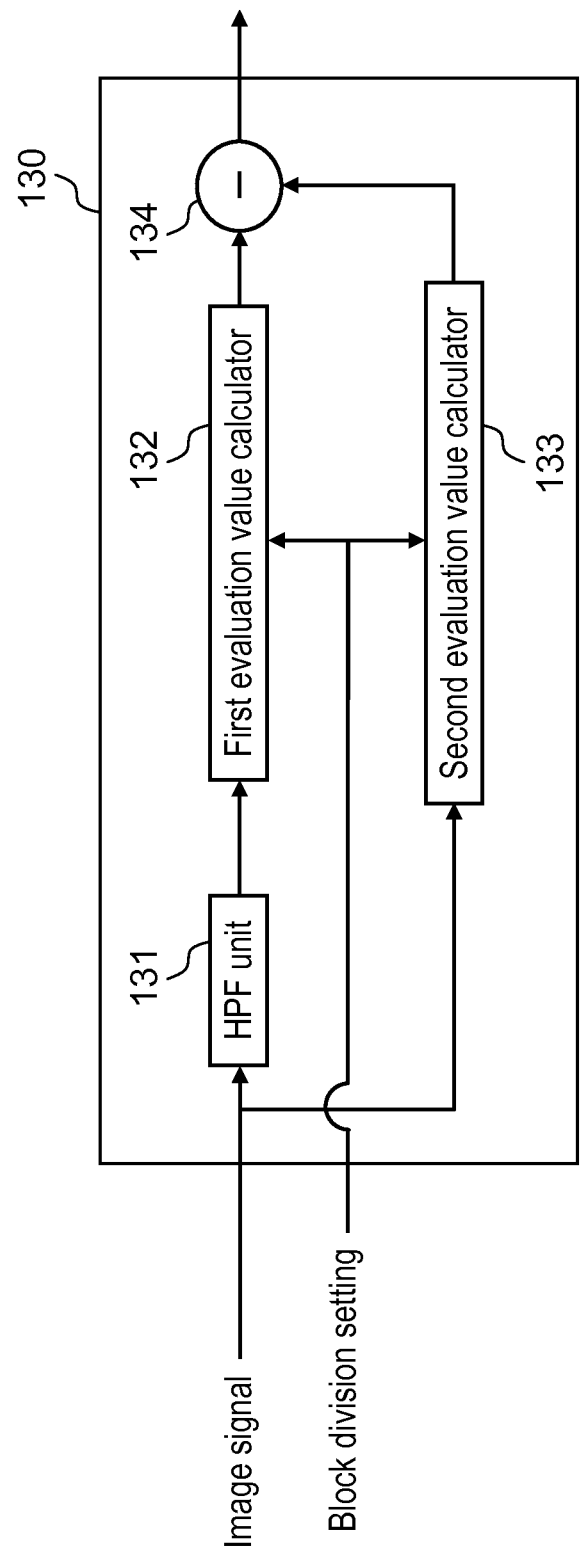
FIG. 2 is a block diagram illustrating an example of a configuration of an evaluation value calculator which is configured to calculate a focus evaluation value.

FIG. 2 is a block diagram illustrating an example of a configuration of the evaluation value calculator which is configured to calculate the focus evaluation value.

Evaluation value calculator 130 is provided with: high-pass filter [HPF] unit 131 which is configured to perform high-pass filtering on the image signal output from image processor 120; first evaluation value calculator 132 which is configured to calculate a first focus evaluation value of each optional block which has been set by block division setting unit 160 from a signal output from HPF unit 131; second evaluation value calculator 133 which is configured to calculate a second focus evaluation value which indicates a degree of defocus of the subject of each optional block which has been set by block division setting unit 160 from the image signal output from image processor 120; and subtractor 134 configured to generate a third focus evaluation value by subtracting the second focus evaluation value from the first focus evaluation value.

1-2. Operation

Operation of imaging apparatus 100 of the above described configuration will be described below.

First, a method of calculating the first focus evaluation value will be described.

As preprocessing for calculating the first focus evaluation value, HPF unit 131 performs high-pass filtering on the image signal output from image processor 120. Further, HPF unit 131 outputs a signal that indicates an absolute value of the high-pass filtered signal to first evaluation value calculator 132. First evaluation value calculator 132 calculates the first focus evaluation value from the signal output from HPF unit 131.

Figure 3:
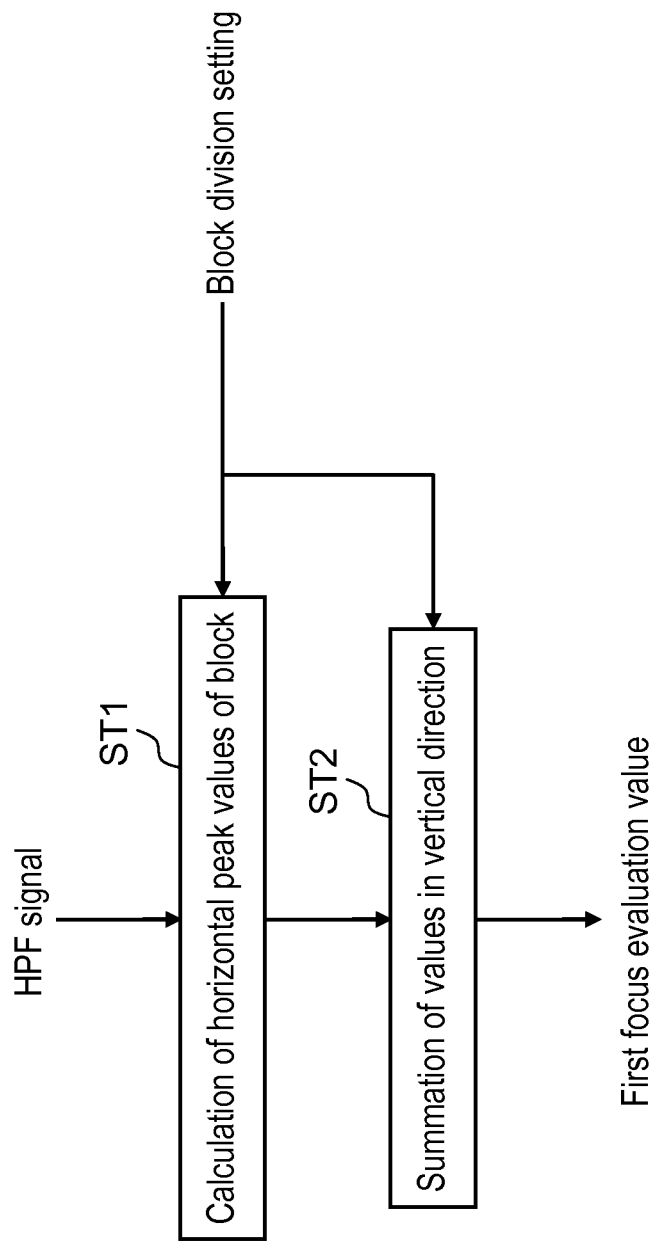
FIG. 3 is a flow chart showing steps for calculating a first focus evaluation value for one block in a first evaluation value calculator.

FIG. 3 is a flow chart showing steps for calculating the first focus evaluation value for one block in the first evaluation value calculator.

First, in ST1, first evaluation value calculator 132 calculates a maximum value for each line in the block specified by block division setting unit 160 from the signal output from HPF unit 131. First evaluation value calculator 132 performs the process of ST1 on every line in the block, and in ST2, outputs the cumulated value of the maximum values calculated for the all lines as the first focus evaluation value of one block. First evaluation value calculator 132 performs the above described processes on each block division.

Figure 4:
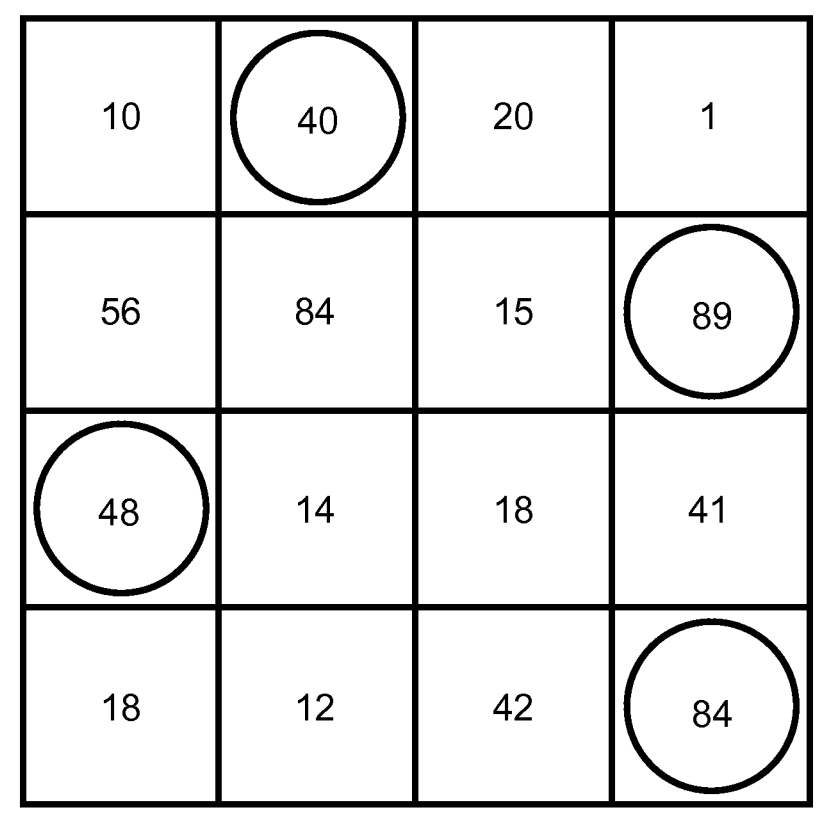

FIG. 4 is a diagram illustrating an exemplary method of calculating the first focus evaluation value for a block which is four pixels by four pixels. As illustrated in FIG. 4, a value in each square indicates a signal level of the signal output from HPF unit 131 for each pixel. The maximum value of the first line in FIG. 4 is encircled "40". The maximum values of the second line, the third line, and the fourth line are "89", "48", and "84", respectively. The sum of these maximum values "261" is the first focus evaluation value.

Now, the first focus evaluation value will be described.

Figure 5:
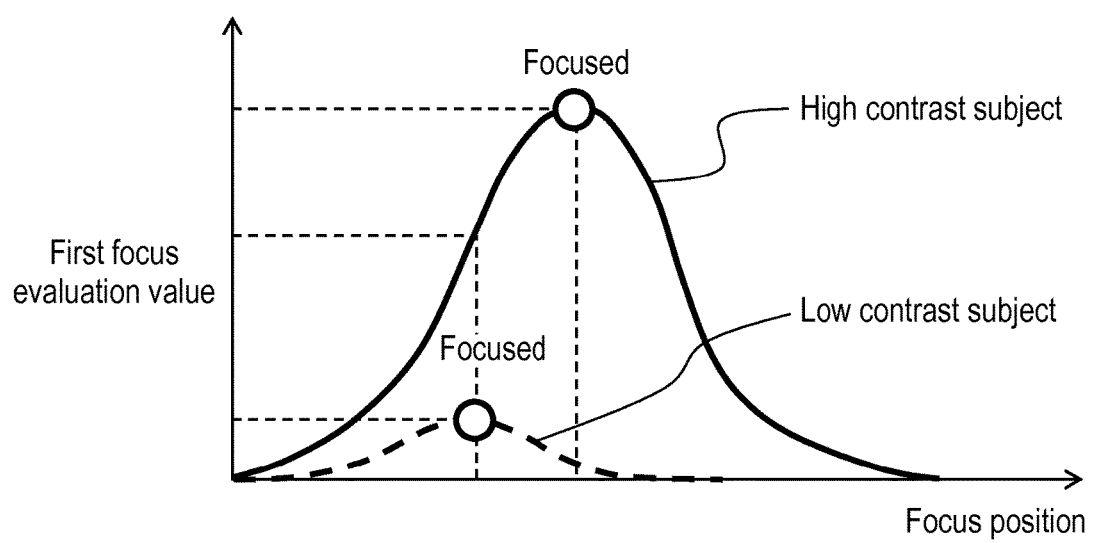
FIG. 5 is a graph showing relationship between a focus position and the first focus evaluation value in cases where a high contrast subject and a low contrast subject are captured.

FIG. 5 is a graph showing relationship between a focus position and the first focus evaluation value in cases where a high contrast subject and a low contrast subject are captured.

As the high contrast subject and the low contrast subject approach an in-focus state respectively, the first focus evaluation values increase. In an autofocus mode, imaging apparatus 100 searches for a position at which the focus evaluation value peaks by moving lenses.

As shown in FIG. 5, as for the focus evaluation value, the value indicating the in-focus state varies in response to the subjects. For example, in a case where a subject with a certain amount of contour such as a landscape, i.e., the high contrast subject, is captured, the focus evaluation value is large, whereas in a case where an evenly-colored subject such as a wall or a blackout curtain, i.e., the low contrast subject, is captured, the focus evaluation value is small.

The focus position of each of the subjects is apparent from a graph of the first focus evaluation value plotted against variation of the focus position as in FIG. 5; however, whether each of the subjects is in focus or not at a particular focus position cannot be determined merely from the first focus evaluation value. That is, the first focus evaluation value is not enough for determining whether each of the subjects is in focus or not. For example in FIG. 5, at the focus position of the low contrast subject, the low contrast subject is in focus but the focus evaluation value of the low contrast subject is smaller than the focus evaluation value of the high contrast subject.

Therefore, since display unit 170 cannot distinguish the in-focus state from a defocused state only from the first focus evaluation value when it is to display a bar that shows the focusing state, display unit 170 cannot display the bar exclusively for a subject that is nearly in focus. To solve the problem, imaging apparatus 100 uses a second focus evaluation value which will be an evaluation value indicating a degree of defocus.

The second focus evaluation value is a threshold to determine whether the first focus evaluation value is a value indicating a largely blurred state, i.e., a largely-blurred state value, or not. Here, a blurred state is a state in which a subject image is formed on the imaging element in a blurred unclear state; the largely-blurred state is a state of large degree of blur; and a non-largely-blurred state is a state of small degree of blur. The largely-blurred state and the non-largely-blurred state are defined as below. The largely-blurred state is a state of the first focus evaluation value the second focus evaluation value and the non-largely-blurred state is a state of the first focus evaluation value>the second focus evaluation value.

Figure 6:
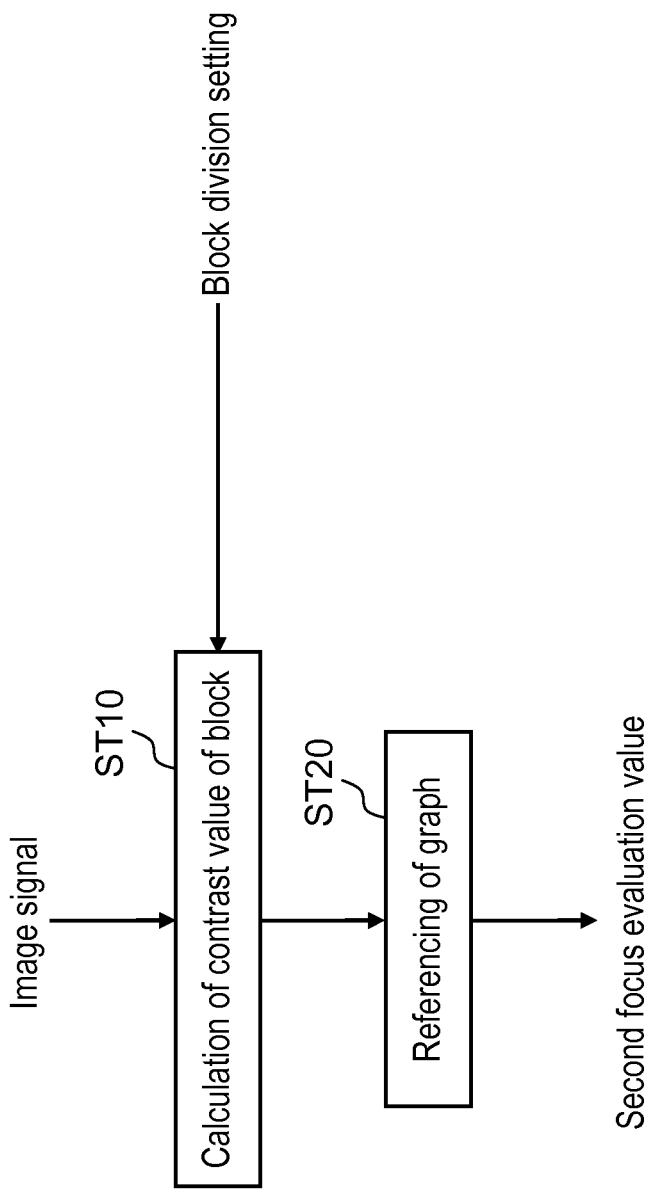
FIG. 6 is a flow chart showing steps for calculating a second focus evaluation value.
Figure 7:
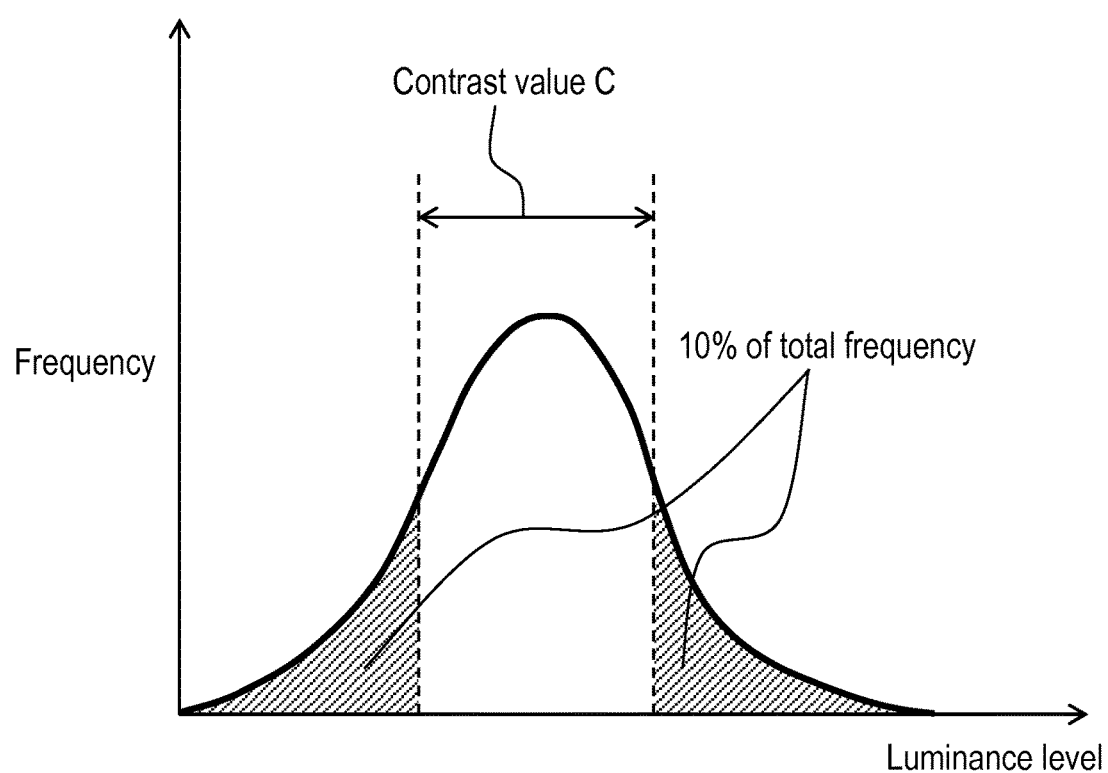
FIG. 7 is a graph for describing an operation of calculating contrast value C.
Figure 8:
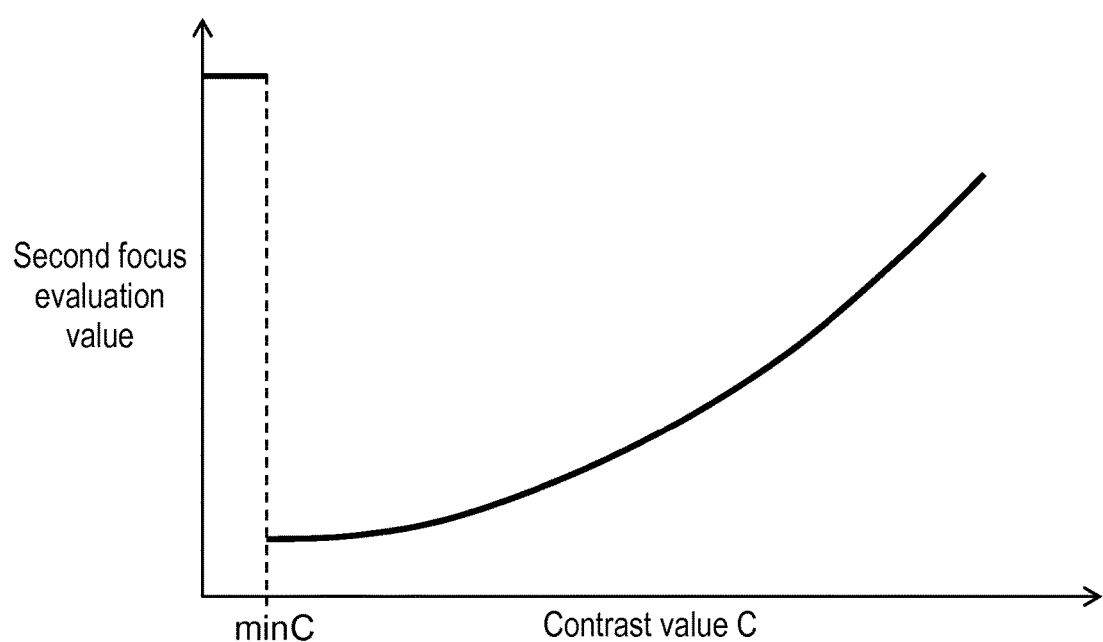
FIG. 8 is a graph for describing a threshold of the first focus evaluation value in a largely-blurred state against contrast value C.

FIG. 6 is a flow chart showing steps for calculating the second focus evaluation value. FIG. 7 is a graph for describing an operation of calculating contrast value C. FIG. 8 is a graph for describing a threshold of the first focus evaluation value in the largely-blurred state against contrast value C.

A method of calculating the second focus evaluation value will be described with reference to FIG. 6.

First, in ST10, second evaluation value calculator 133 calculates contrast value C for each block with respect to the image signal output from image processor 120. As shown in FIG. 7, it is assumed that contrast value C is a width of the whole frequency with 10% of the whole frequency narrowed from both of a maximum and a minimum of the whole frequency in a luminance histogram for each block.

In ST20, second evaluation value calculator 133 calculates the second focus evaluation value. As shown in FIG. 5, the focus evaluation value calculated by first evaluation value calculator 132 or the like tends to increase as contrast value C increases and tends to decrease as contrast value C decreases. Therefore, in a case where contrast value C is small, a first focus evaluation value that indicates a largely-blurred state is also small, whereas in a case where contrast value C is large, the first focus evaluation value that indicates a largely-blurred state is also large. For that reason, as shown in FIG. 8, second evaluation value calculator 133 is configured to have the threshold of the first focus evaluation value in the largely-blurred state, i.e., the second focus evaluation value, for contrast value C set in advance and to calculate the second focus evaluation value by referencing the graph of FIG. 8. Second evaluation value calculator 133 determines extremely small contrast value C which is as small as minC or below in FIG. 8 to be a noise and sets the second focus evaluation value to the maximum. That is, second evaluation value calculator 133 increases the second focus evaluation value for a large contrast value of the video image division and decreases the second focus evaluation value for a small contrast value of the video image division.

As described above, evaluation value calculator 130 calculates the second focus evaluation value in response to the contrast value of the video image division in each block, and then, subtracts the second focus evaluation value from the first focus evaluation value for each block by subtractor 134 to generate the third focus evaluation value. On condition that the third focus evaluation value is 0 or smaller, evaluation value calculator 130 outputs a value clipped to 0 as a focus evaluation value. As a result, a block with the third focus evaluation value of 0 is determined to be a subject in the largely-blurred state, whereas a subject with the focus evaluation value which is other than 0 is determined to be a subject in the non-largely-blurred state.

Now, assist video image generating unit 140 will be described. Assist video image generating unit 140 is configured to generate an assist video image from the focus evaluation value of each block output from evaluation value calculator 130 and overlay the generated assist video image on the image signal output from image processor 120.

Figure 9B:
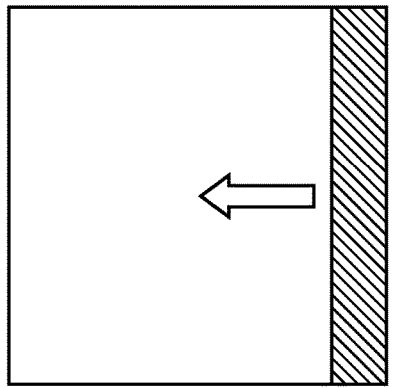
FIG. 9B is a diagram illustrating an example of the assist video image pattern.
Figure 9D:
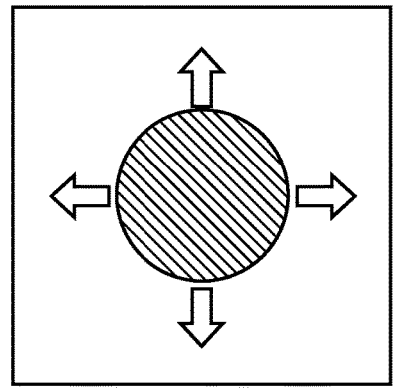
FIG. 9D is a diagram illustrating an example of the assist video image pattern.
Figure 9A:
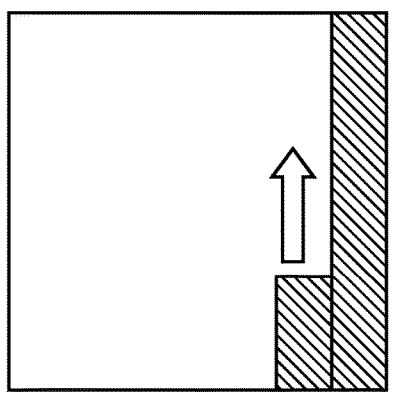
FIG. 9A is a diagram illustrating an example of an assist video image pattern.
Figure 9C:
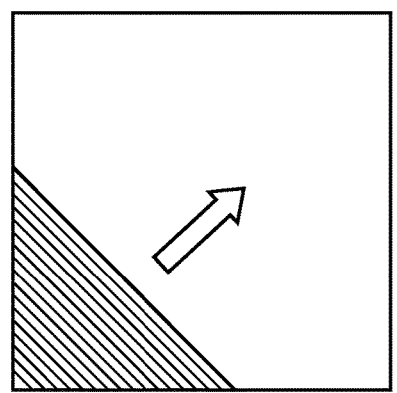
FIG. 9C is a diagram illustrating an example of the assist video image pattern.

FIG. 9A, FIG. 9B, FIG. 9C, and FIG. 9D are diagrams illustrating examples of the assist video image pattern. FIG. 9A is an example of a two-dimensional bar pattern, FIG. 9B is an example of a vertical bar pattern, FIG. 9C is an example of a triangular bar pattern, and FIG. 9D is an example of a circular bar pattern. Although the other patterns are possible, the two-dimensional bar pattern of FIG. 9A will be described in the present exemplary embodiment.

In a case where the third focus evaluation value output from evaluation value calculator 130 is 0, assist video image generating unit 140 causes nothing to be displayed. In a case where the third focus evaluation value is 0 or larger, assist video image generating unit 140 generates the assist video image of each block in response to the focus evaluation value output from evaluation value calculator 130. Assist video image generating unit 140 causes a bar as long as v/x pixels to be displayed where accuracy of the focus evaluation value for one pixel is x and the calculated focus evaluation value is v. Since the two-dimensional bar is to be displayed in the present technique, "v/x/bw+1" which is the quotient of v/x further divided by the width of one block bw and with 1 added is a number of bar rows and a reminder is the length of the top bar. The bar may be semitransparent or the like so that the video image behind the bar is visible.

Video image selector 150 is configured to select a video image output from image processor 120 and a video image output from assist video image generating unit 140 and to output the selected video images. Video image selector 150 is configured with a microcomputer or the like and configured to switch the video image in response to Assist Display ON-OFF which is commanded by the user from a button or the like. Display unit 170 is configured to display the video image output from video image selector 150 on a viewfinder or the like. The user adjusts a focus by checking the presented assist display.

1-3. Effects and the Like

As described above, in the present exemplary embodiment, imaging apparatus 100 has imaging unit 110, image processor 120, evaluation value calculator 130, assist video image generating unit 140, video image selector 150, block division setting unit 160, and display unit 170. Imaging unit 110 captures an image of a subject and generates an image signal. Image processor 120 performs various types of image processing. Evaluation value calculator 130 calculates the focus evaluation value for each block which has been set by block division setting unit 160. Assist video image generating unit 140 generates the assist video image based on the focus evaluation value of each block which has been calculated by evaluation value calculator 130. Video image selector 150 selects a video image input from image processor 120 and a video image input from assist video image generating unit 140 and outputs the selected video images to display unit 170. Display unit 170 displays the input video image on a viewfinder or the like.

As a result, the bar is not displayed for a largely-blurred portion. Therefore, the bar is more likely to be displayed only for a subject that is nearly in focus, so that the user can more easily adjust a focus by viewing the video image.

Figure 10B:
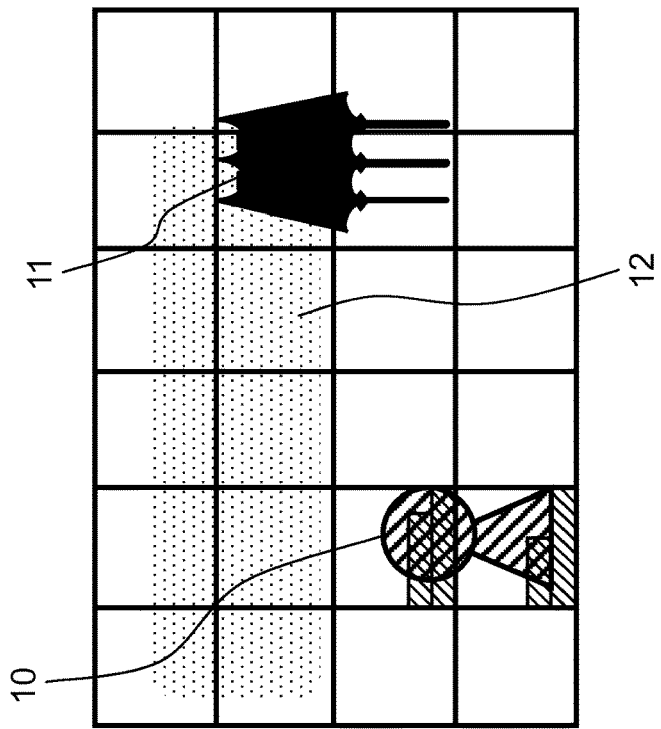
FIG. 10B is a diagram illustrating an example of the assist display in the exemplary embodiment.
Figure 10A:
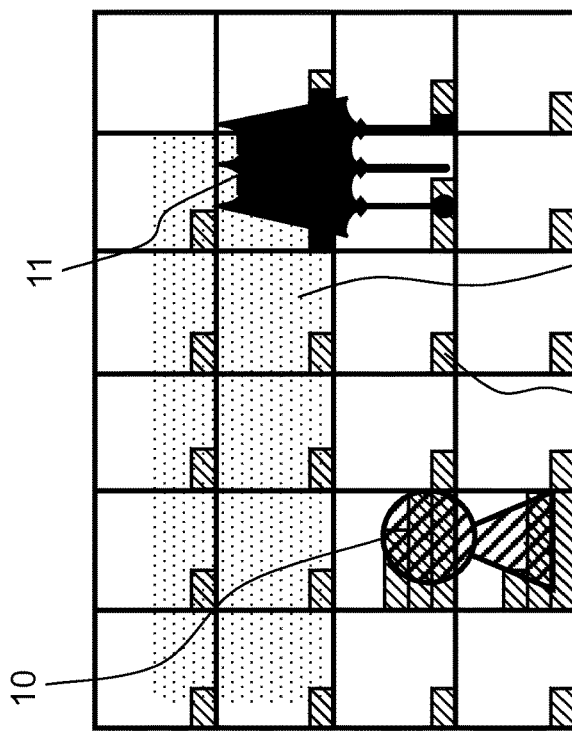
FIG. 10A is a diagram illustrating an example of an assist display in the exemplary embodiment.

FIG. 10A and FIG. 10B are diagrams illustrating examples of the assist display in the present exemplary embodiment. FIG. 10A and FIG. 10B contain video image 10 of a first subject which is in focus, video image 11 of a second subject which is defocused, and video image 12 of a third subject which is defocused.

FIG. 10A illustrates a case where only the first focus evaluation value is used in which the bar is displayed in each block of the whole screen and considerably obscures the subject behind the bar. FIG. 10B illustrates a case where the second focus evaluation value is applied in which the bar display in the largely-blurred state has been removed so that the bar is displayed only for video image 10 of the first subject which is nearly in focus.

Figure 11B:
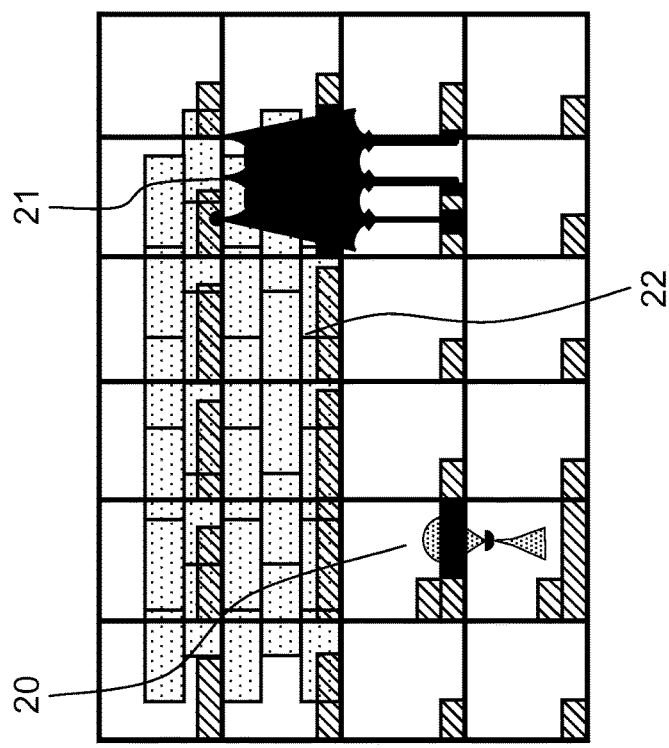
FIG. 11B is a diagram illustrating an example of the assist display in a case where a low contrast subject is focused on in the exemplary embodiment.
Figure 11A:
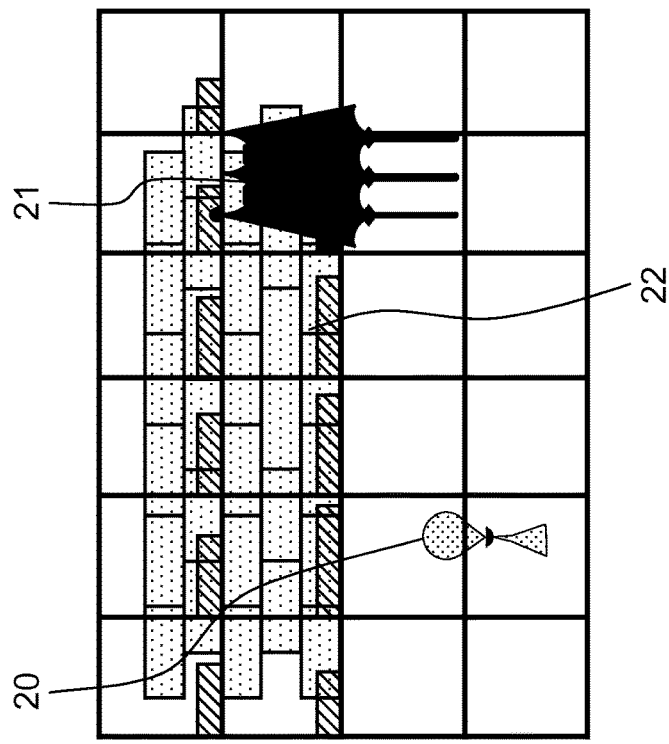
FIG. 11A is a diagram illustrating an example of the assist display in a case where a low contrast subject is focused on in the exemplary embodiment.

FIG. 11A and FIG. 11B are diagrams illustrating examples of the assist display in a case where a low contrast subject is focused on in the present exemplary embodiment. FIG. 11A and FIG. 11B contain video image 20 of a high contrast first subject which is defocused, video image 21 of a second subject which is defocused, and video image 22 of a low contrast third subject which is in focus.

On condition that a fixed value is set to the second focus evaluation value so that a bar corresponding to video image 20 of the high contrast first subject is removed in a case where the video image 22 of the low contrast third subject as illustrated in FIG. 11A is focused on, the bar display corresponding to video image 22 of the low contrast third subject which is in focus would be also removed. By using the second focus evaluation value based on contrast value C of the present technique, imaging apparatus 100 is able to display the bar corresponding to video image 22 of the low contrast third subject which is in focus while removing the bar display corresponding to video image 20 of the high contrast first subject which is defocused as illustrated in FIG. 11B.

Since the imaging apparatus according to the present technique generates the third focus evaluation value by subtracting the second focus evaluation value which indicates a defocused state from the first focus evaluation value of a block and combines the generated third focus evaluation value with the frame video image as described above, the imaging apparatus is able to display the focus evaluation value only for the subject that is nearly in focus. The imaging apparatus provides the focus evaluation value displayed at a video image of a subject on which the user is focusing, so that the user can focus on the subject by checking the video image.

Other Exemplary Embodiments

The exemplary embodiment has been described above as an example of the technique disclosed in the present application. However, the present technique is not limited to the exemplary embodiment and may also be applied to exemplary embodiments which have been subjected to modification, substitution, addition, or omission as required.

Then, other exemplary embodiments will be described below as examples.

Although the exemplary embodiment has been described above by taking an example of a case where a video image is divided into blocks, the video image does not need to be divided into blocks and the focus assist technique of the present technique is effective even in a case where the user has specified one or more optional blocks to optional positions. For example, even in a case where the user has specified a block to an optional position, the bar display in a blurred state can be removed.

Further, although the exemplary embodiment has been described above by taking an example of a case where horizontal cumulation of the maximum values of the blocks is used in the calculation of the first focus evaluation value, the present technique is not limited to the method and the other methods such as a method of vertically cumulating the maximum values of the blocks may be used in the calculation of the first focus evaluation value.

Although contrast value C has been described as a width of the whole frequency with 10% of the whole frequency narrowed from both of the maximum and the minimum of the whole frequency in a luminance histogram for each block, the other contrast values such as the width of the whole frequency with 5% of the whole frequency reduced or the value of the remainder after simple subtraction of the minimum luminance in the block from the maximum luminance may be used.

The present technique is applicable to an imaging apparatus with a manual focus function. Specifically, the present technique can be applied to an interchangeable-lens still camera, a news video camera, and a production video camera. Incidentally, although the exemplary embodiment has been described above by taking an example of a case where the focus assist technique is applied to an imaging apparatus, it is needless to say that the focus assist technique is also applicable to the other image processors such as a computer.

What is claimed is:

1. A method comprising:
    generating an image signal from a subject;
    calculating, for each of a plurality of blocks obtained by dividing a frame of the image signal, a characteristic value;
    calculating, for each of the plurality of blocks, a focus evaluation value that indicates a degree of focusing on the subject from the image signal based on the characteristic value;
    generating a focus assist video image that indicates the degree of focusing for some or all of the plurality of blocks based on the focus evaluation value;
    combining the generated focus assist video image with the image signal so that the focus assist video image is displayed on a part of each of the some or all of the plurality of blocks; and
    displaying the focus assist video image combined with the image signal,
    wherein the focus assist video image includes a plurality of figures, each of the plurality of figures being located in a corresponding one of the some or all of the plurality of blocks,
    wherein each of the plurality of figures changes size depending on (i) the degree of focusing for the corresponding one of the some or all of the plurality of blocks and (ii) the characteristic value for the corresponding one of the some or all of the plurality of blocks, wherein for each of the some or all of the plurality of blocks having a same degree of focusing, the size of the figure corresponding to the block is the same, and wherein for each of the some or all of the plurality of blocks having a same characteristic value and a different degree of focusing, the size of the figure corresponding to the block is the different, and wherein the calculating the focus evaluation value includes:
calculating, for each of the plurality of blocks, a first evaluation value which indicates the degree of focusing on the subject;
calculating, for each of the plurality of blocks, a second evaluation value which indicates a degree of defocus of the subject; and
generating, for each of the plurality of blocks, the focus evaluation value by subtracting the second evaluation value from the first evaluation value.

2. The method according to claim 1, wherein for each of the plurality of blocks, the second focus evaluation value is calculated based on the characteristic value for the block, the characteristic value for the block indicating a contrast value of a divided video image in the block.

3. The imaging apparatus according to claim 1, wherein for each of the plurality of blocks, the second focus evaluation value is larger as the characteristic value of the block is larger.

4. The method according to claim 1,
wherein each of the plurality of figures changes size depending on the degree of focusing for the corresponding one of the some or all of the plurality of blocks such that each of the plurality of figures has a larger size as the degree of focusing for the corresponding one of the some of all of the plurality of blocks is larger.

5. The method according to claim 1,
wherein each of the plurality of figures changes size depending on the degree of focusing for the corresponding one of the some or all of the plurality of blocks such that each of the plurality of figures has one of a first size and a second size smaller than the first size, the first size indicating a larger degree of focusing for the corresponding one of the some of all of the plurality of blocks than the second size.

6. The method according to claim 1,
wherein the some or all of the plurality of blocks includes a first block and a second block,
wherein when the degree of focusing for a first block is different than the degree of focusing for a second block and the characteristic value for the first block is the same as the characteristic value for the second block, the size of the figure corresponding to the first block is different from the size of the figure corresponding to the second block, and
wherein when the degree of focusing for the first block is the same as the degree of focusing for the second block, the size of the figure corresponding to the first block is the same as the size of the figure corresponding to the second block.

7. A method comprising:
generating an image signal from a subject;
calculating, for each of a plurality of blocks obtained by dividing a frame of the image signal, a characteristic value;
calculating, for each of the plurality of blocks, a focus evaluation value that indicates a degree of focusing on the subject from the image signal based on the characteristic value;
generating a focus assist video image that indicates the degree of focusing for some or all of the plurality of blocks based on the focus evaluation value;
combining the generated focus assist video image with the image signal so that the focus assist video image is displayed on a part of each of the some or all of the plurality of blocks; and
displaying the focus assist video image combined with the image signal,
wherein the focus assist video image includes a plurality of figures, each of the plurality of figures being located in a corresponding one of the some or all of the plurality of blocks,
wherein each of the plurality of figures changes size depending on the degree of focusing for the corresponding one of the some or all of the plurality of blocks, and
wherein the calculating the focus evaluation value includes:
calculating, for each of the plurality of blocks, a first evaluation level indicating an in-focus state for the block, the value of the in-focus state being larger as the characteristic value for the block is larger;
calculating, for each of the plurality of blocks, a second evaluation level based on the first evaluation level, the value of the second evaluation level being larger as the value of the first evaluation level is larger; and
generating, for each of the plurality of blocks, the focus evaluation value by subtracting the second evaluation value from the first evaluation level.

8. The method according to claim 7,
wherein for each of the plurality of blocks, the second evaluation level is calculated based on the characteristic value for the block, the characteristic value for the block indicating a contrast value of a divided video image in the block.

9. The method according to claim 7,
wherein for each of the plurality of blocks, the second evaluation level is larger as the characteristic value of the block is larger.

10. The method according to claim 7,
wherein each of the plurality of figures changes size depending on the degree of focusing for the corresponding one of the some or all of the plurality of blocks such that each of the plurality of figures has a larger size as the degree of focusing for the corresponding one of the some of all of the plurality of blocks is larger.

11. The method according to claim 7,
wherein each of the plurality of figures changes size depending on the degree of focusing for the corresponding one of the some or all of the plurality of blocks such that each of the plurality of figures has one of a first size and a second size smaller than the first size, the first size indicating a larger degree of focusing for the corresponding one of the some of all of the plurality of blocks than the second size.

12. The method according to claim 7,
wherein the some or all of the plurality of blocks includes a first block and a second block, wherein when the degree of focusing for a first block is different than the degree of focusing for a second block and the characteristic value for the first block is the same as the characteristic value for the second block, the size of the figure corresponding to the first block is different from the size of the figure corresponding to the second block, and wherein when the degree of focusing for the first block is the same as the degree of focusing for the second block, the size of the figure corresponding to the first block is the same as the size of the figure corresponding to the second block.

\* \* \* \* \*